May 8, 1962 W. S. KNOWLES 3,034,107
MEMORY SENSING CIRCUIT
Filed Dec. 27, 1960
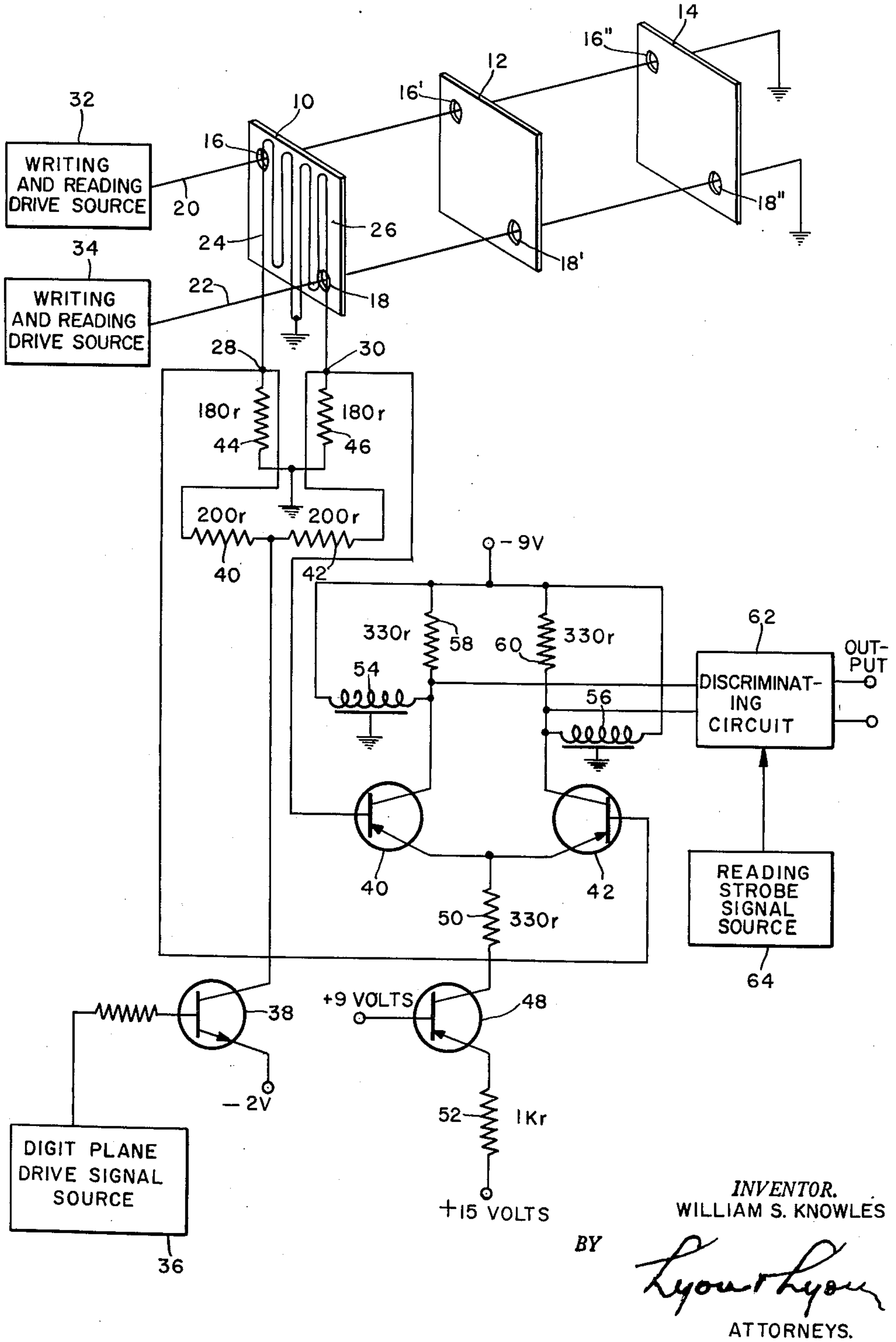
INVENTOR.
WILLIAM S. KNOWLES
BY Lyon & Lyon
ATTORNEYS.

United States Patent Office 3,034,107
Patented May 8, 1962

3,034,107

MEMORY SENSING CIRCUIT

William S. Knowles, Malibu, Calif., assignor to Ampex Corporation, Culver City, Calif., a corporation of California Filed Dec. 27, 1960, Ser. No. 78,757
4 Claims. (Cl. 340—174)

This invention relates to circuits employed to detect data stored in a memory, and, more particularly, to improvements in sensing circuits which are used with magnetic-core memories.

A popular magnetic-core memory construction is one wherein a plurality of magnetic-core planes are provided, each core plane comprising magnetic cores arranged in rows and columns. The core planes are positioned so that the cores in each plane are aligned with similarly positioned cores in the other planes. Any different number of arrangements for threading windings through the cores may be employed for securing a desired type of storage and readout of information which has been stored; however, a preferred arrangement is one wherein a similarly located core in each core plane represents by its state of magnetic remanence a bit of data, whereby data words, consisting of a plurality of bits, may be stored. Any desired arrangement for applying current to windings coupled to the cores which store a single word may be employed for the purpose of establishing these cores in one or the other of their states of remanence for storing that word. One preferred arrangement is to provide a winding which is inductively coupled to a similarly positioned core in each one of the core planes, whereby current may be applied to that winding for driving each one of the cores from one to the other state of magnetic remanence. Another winding is provided, one for each core plane. A current may or may not be applied to said other winding, commonly known as a digit plane winding. This current, when applied, serves to inhibit the drive applied to a core from the first winding. Thus, a method of writing into the magnetic memory is established.

For the purpose of readout of the data, heretofore a separate reading winding was provided for each core plane which is coupled to all the cores in the plane. Upon excitation of the winding coupled to a core in all of the core planes, a voltage is induced in the reading windings coupled to cores which are driven in response to that excitation. Thus, a means for reading out the data stored in the cores in a memory is briefly described.

A large number of cores are usually employed in each core plane, and these cores are usually quite small. Accordingly, threading of these cores with windings is a rather difficult and tedious task. Thus, in order to save the cost of threading these cores with a winding, it has been proposed to use the digit-plane winding, which threads all the cores of a plane, as the sense winding. This can be done, since the digit-plane is not used during the reading interval. Although this does save on the cost of the manufacture of a memory, it does present some problems, since the digit-plane windings are excited with a fair amount of current, and to turn off this current and thereafter immediately employ the winding for purposes of reading causes problems. Any amplifiers or transformers, which are employed in connection with the core plane winding for the purpose of sensing, find themselves either saturated or so adversely affected by noise signals that, in order to have any use of the arrangement, a sufficient interval had to be allowed between writing and reading to permit the effects of the noise signals to subside. Since it is desired to carry on the operation of the memory at extremely high rates, it is quite essential that this residual effect must be canceled or eliminated in order to use the arrangement.

An object of this invention is to provide an arrangement for use with a memory system of the general type described wherein the deleterious effects of using a winding for sensing and driving are substantially eliminated.

Another object of the present invention is the provision of a circuit arrangement wherein the operation of reading may follow the operation of writing with a minimum of delay between the two.

Yet another object of the present invention is the provision of a novel differential amplifier which enables the cancelation of unwanted signals and the passage of desired signals.

These and other objects of the invention may be achieved in an arrangement wherein for each plurality of memory elements collected, for example, in a core plane which are to be sensed there are provided two digit-plane windings. Each of these is coupled inductively to one-half of the memory elements in the plane. These digit-plane windings are excited simultaneously for the purposes of writing data. Upon the occurrence of a drive for reading out of data, a signal is induced in one or the other of these two windings, as determined by the state of the storage of the memory elements. There is further provided in accordance with this invention a differential amplifier which includes two transistors, and the two digit-plane windings are respectively coupled to these two transistors. Delay means are coupled to the collectors of these two transistors, and an output is taken from the two collectors of these two transistors. The delay means serve the function of providing unwanted signal cancelation, and, further, preserve the base, or D.C. level, the detection of a departure from which indicates the presence of a reading signal from the memory.

The novel features that are considered characteristic of this invention are set forth with particularity in the appended claims. The invention itself, both as to its organization and method of operation, as well as additional objects and advantages thereof, will best be understood from the following description when read in connection with the accompanying drawing, which is a circuit diagram of an embodiment of the invention.

The drawing shows only three digit-core planes 10, 12, 14, represented by rectangles. This, of course, is by way of illustration, since as is well known a magnetic-core memory of the type with which this invention finds its most significant use may include a large number of these digit-core planes. It is to be understood that one of the circuits shown, which is an embodiment of the invention, is required for each digit-core plane, although only one is shown for the digit-core plane 10. This digit plane includes a plurality of cores 16, 18 by way of example. Usually, these cores are arranged in columns and rows and similarly positioned cores in each digit plane are threaded by the drive windings 20, 22. For each digit plane 10, 12, 14, there is provided a first digit-plane winding 24 and a second digit-plane winding 26. Each of these digit-plane windings is inductively coupled to one-half of the cores in a digit plane. Thus, by way of representation, digit-plane winding 24 is inductively coupled to the core 16 and digit-plane winding 26 is inductively coupled to the core 18. One end of each digit-plane winding is connected to ground; the other end of each digit-plane winding is connected to a terminal, respectively 28, 30.

For the purpose of writing data into each one of the cores 16, 16', 16'', etc., the writing-and-reading drive source 32 applies current of one polarity to the winding 20. The value of the magnetomotive force which is applied to the core 16 and other similarly positioned cores in the other core planes is sufficient to drive those cores from one to the other of their states of magnetic remanence. Those cores which it is desired to prevent from being driven by the drive from the source 32 may be inhibited by applying a current to the two digit-plane windings 24, 26. A digit-plane drive signal source 36 applies a signal to a current-driving transistor 38. The collector of this transistor is connected through the two resistors 40, 42 to the respective terminals 28, 30. Operating potential is applied to the emitter of transistor 38 and ground. Thus, current flows through the two windings 24, 26 and inhibits the cores in the core plane 10 from being driven by the current applied thereto from any one of the writing-and-reading drive sources 32, 34.

It is desired to terminate the writing operation and read information stored in the memory as quickly as possible after the termination of such writing operation. The current applied to the digit-plane windings for the purposes of inhibiting the cores in the core plane is quite high. The signal derived by reading the core, i.e., driving it with current of opposite polarity than the writing current, from one state of magnetic remanence to the other to induce a voltage in the sensing winding, is quite low. The sudden turnoff of the writing currents causes noise voltages to be induced in the inhibit winding, which must be suppressed in order to afford a detection of the voltage induced in the digit-plane winding in response to the reading operation. In accordance with this invention, this is achieved by employing a differential amplifier using two transistors, respectively 40, 42. The base of transistor 40 is connected to the terminal 30, which is one end of the digit-plane winding 26. The base of transistor 42 is connected to the terminal 28, which is one end of the digit-plane winding 24. Any signals which are induced in the respective digit-plane windings are developed across the respective resistors 44, 46, which are connected between the terminals 28, 30 and ground. These signals are accordingly applied to the bases of transistors 40, 42.

A source of constant current is applied to the transistors 40, 42. This is provided by means of a transistor 48, which is connected through a resistor 50 to the emitters of the transistors 40, 42. A potential source on the order of 15 volts is applied to the collector of the transistor 48 through a resistor 52. A biasing potential source is applied to the base of the transistor 48 in order to maintain it conductive at a desired current level. The respective collectors of the transistors 40, 42 are connected to a source of operating potential, here exemplified by −9 volts, through the respective delay lines 54, 56 in parallel with which are connected the respective resistors 58, 60. Output is taken from the collectors of the transistors 40, 42, which is applied to following discriminating circuits 62. The discriminating circuits may be energized during the reading interval by the reading strobe signal source 64.

With the arrangement shown, noise signals which usually affect both windings 24, 26 about evenly receive even amplification by the transistors 40, 42 and may easily be canceled. The transistors do not saturate during the time the digit circuit is being driven from the transistor 38 and exhibit an excellent recovery time. Further, because of the clipping characteristics afforded by the arrangement shown, voltage excursions at the collectors due to noise of the digit drive are limited to a value not more than two or three times the amplitude of a signal which is obtained by turning over of a core while being read. A further advantage of this amplifier is that since the input impedance is somewhat higher than can be achieved practically using a sense transformer, as has been the practice heretofore, coupling between digit lines 24, 26 is minimized. This is important, since a sense signal may be degraded by such coupling.

Although the signal on either collector of the difference amplifiers is quite clean, there still remains the problem of defining a base line, detection of a departure from which enables an indication of whether or not the core has been turned over due to the reading drive. Because some imbalance of currents between the two transistors 40, 42 is inevitable, the direct current at which the reading signal begins cannot be exactly defined. Examining the signal which can be expected from the sensing lines, it is readily apparent that a vanishingly small instant of time is the most that might be available to grasp as a reference base line, since nearly all the cycle is used up between the digit drive-winding excursions and the sense time.

The function of the delay lines 54, 56 in the circuit will now be explained. Consider a delay line with an electrical length of 0.1 microsecond, connected to the collectors of the transistors 40, 42 and properly terminated. If a means for sensing the relative voltage at the two ends of such a line is provided, and if the reading circuits which follow transistors 40, 42 are strobed or turned on at read time, a function performed by the reading-strobe signal source 64, then when a signal from a core has occurred, the beginning of the delay line will have the turnover signal peak on it, while the far end of the delay line is still registering the base-line voltage just prior to the start of the turnover signal. All noise from the digit drive which has occurred previously will have been dissipated by the termination resistor of the delay line after traveling through the line.

The circuit shown in the drawing, where the delay 54, 56 lines are each connected between the collector and the source of operating potential in parallel with a separate resistor 58, 60 having the resistance value equal to the characteristic impedance of the delay line, takes advantage of the operation described. The length of the delay line is half of the electrical length required, or 0.05 microsecond. The end of the delay line connected to the source of operating potential, here 9 volts, essentially is short-circuited. A termination resistance effectively is provided at the junction of the delay-line input and the transistor collectors. Thus, in operation, the noise signals which occur are effectively dissipated by reflection and absorption in the characteristic impedance at the input end of the delay line. At the beginning of the reading period, the voltage at the collector is that of the base line, and any departure therefrom during the reading period is indicative of the fact that a core has turned over in response to the reading current.

In an embodiment of the invention which has been built, the values assigned to the resistors shown in the drawing were employed. Transistors designated by the type 2N710 were employed. If it is desired to handle a very large storage capacity (words), the combination digit sense winding may be split into a plurality of sections, and a similar plurality of transistors may be connected in parallel to the ones 40, 42 shown in the drawing, and the same delay lines may be used for all. The rectangle labeled discriminating circuits 62 is representative of circuits well known in the art, as well as the reading-strobe signal source 64. It is noted that transistor 38 is of the NPN type, while transistors 48, 42, and 40 are of the PNP type. These transistor types, as well as the values of the resistors and the delay interval of the delay line, are given as an illustration of an operative embodiment of the invention. These are not to be construed as a limitation upon the invention; however, those well skilled in the art can readily vary these values and the transistor types, after having had the benefit of this disclosure, without departing from the spirit and scope of the invention.

There has accordingly been described and shown herein a novel and useful circuit arrangement whereby it is possible to use a winding in memories of the type described for both writing and sensing purposes. The speed of operation of the arrangement is not reduced or hindered due to components becoming saturated due to unwanted signals arising in these lines. A means is provided for obtaining cancelation of unwanted signals and for indicating a base level whereby detection of a desired signal may be achieved by determining whether there are any departures from that base level during the reading interval.

I claim:

1. A differential amplifier circuit for sensing the presence of a signal in either of two circuits comprising a first and second transistor each having base, collector and emitter electrodes, means for connecting for signal sensing one of said two circuits to the base of said first transistor, means for connecting for signal sensing the other of said two circuits to the base of said second transistor, first and second delay lines each having two ends, first and second resistors each connected between the two ends of said respective first and second delay lines, said first and second resistors each having a resistance value equivalent to the characteristic impedance of said first and second delay lines, means for connecting one end of said first delay line to said first transistor collector, means for connecting one end of said second delay line to said second transistor collector, means for applying operating potential for said first and second transistors to the other ends of said first and second delay lines, a constant-current source, means connecting said constant-current source to the emitters of said first and second transistors, and means for deriving outputs from the respective collectors of said first and second transistors.

2. In a memory system of the type having a plurality of bistable memory elements, wherein a common winding is employed for establishing said memory elements in a desired stable state and for subsequently detecting the stable state into which one of said elements has been placed, the improvement comprising a first and second winding each respectively coupled for driving and sensing to one-half of the memory elements, each having a first and second end, means for connecting said first ends together, means for applying a driving current coupled to the second end of said first and second windings, and a sensing circuit for said first and second windings comprising a first and second transistor each having base, collector and emitter electrodes, means for connecting said first winding second end to the base of said first transistor, means for connecting said second winding second end to the base of said second transistor, first and second delay lines each having two ends, first and second resistors each connected between the two ends of said respective first and second delay lines, said first and second resistors each having a resistance value equivalent to the characteristic impedance of said first and second delay lines, means for connecting one end of said first delay line to said first transistor collector, means for connecting one end of said second delay line to said second transistor collector, means for applying operating potential for said first and second transistors to the other ends of said first and second delay lines, a constant-current source, means connecting said constant-current source to the emitters of said first and second transistors, and means for deriving outputs from the respective collectors of said first and second transistors.

3. In a memory system as recited in claim 2 wherein said constant-current source comprises a third transistor having collector, base and emitter electrodes, a resistor connecting said third transistor collector to said first and second transistor emitters, means for applying operating potential to said third transistor emitter, and means for applying a bias to said third transistor base to maintain said third transistor conductive.

4. In a memory system of the type having a plurality of bistable memory elements, wherein a common winding is employed for establishing said memory elements in a desired stable state and for subsequently detecting the stable state into which one of said elements has been placed, the improvement comprising a first and second winding each respectively coupled for driving and sensing to one-half of the memory elements, each having a first and second end, means for connecting said first ends together, means for applying a driving current coupled to said first and second windings second ends including a first transistor having emitter, collector and base electrodes, means for applying drive signals to said first transistor base, and first and second resistors respectively connecting said first transistor collector to said respective first and second windings second ends, a sending circuit for said first and second windings including a second and third transistor each having base, emitter and collector electrodes, means connecting said first winding second end to said second transistor base, means connecting said second winding second end to said third transistor base, a pair of delay lines, a separate resistor connected between the ends of each of said delay lines, the resistance value of each said separate resistors equalling the characteristic impedance of the delay line across the ends of which it is connected, a source of operating potential, means connecting said pair of delay lines between said source of operating potential and the respective second and third transistor collectors, a constant-current source, means for connecting said constant-current source to the emitters of said second and third transistors, and means for deriving outputs from the collectors of said second and third transistors.

No references cited.